July 17, 1956   H. E. ALTGELT   2,754,742
DRAFT AND POSITION CONTROL HITCH DEVICE
Filed Nov. 9, 1951   5 Sheets-Sheet 3
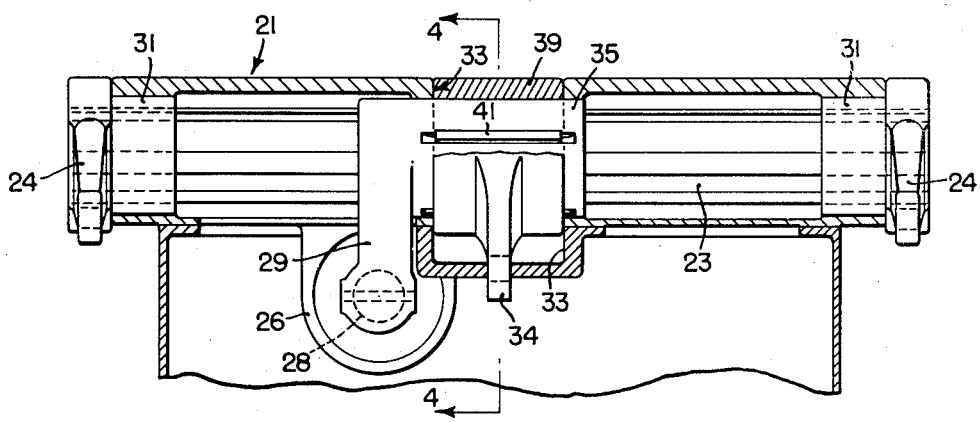
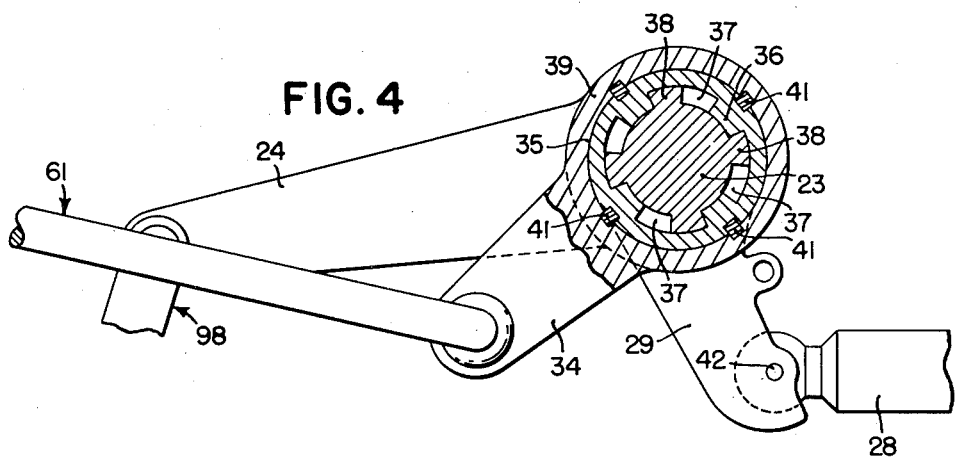
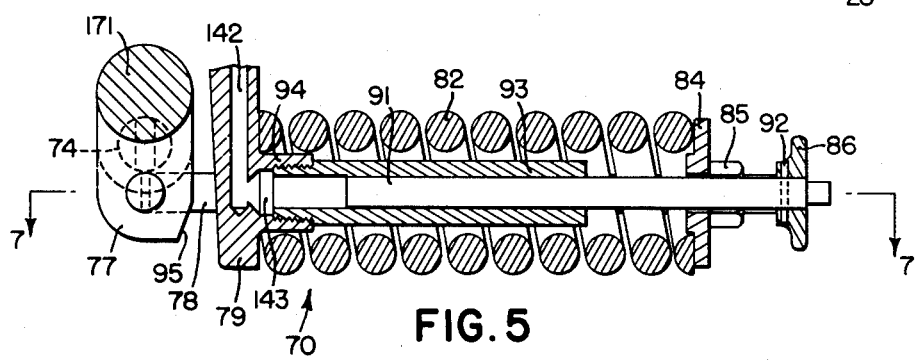
INVENTOR.
HERMAN E. ALTGELT
BY
ATTORNEYS July 17, 1956
H. E. ALTGELT
2,754,742
DRAFT AND POSITION CONTROL HITCH DEVICE
Filed Nov. 9, 1951
5 Sheets-Sheet 4
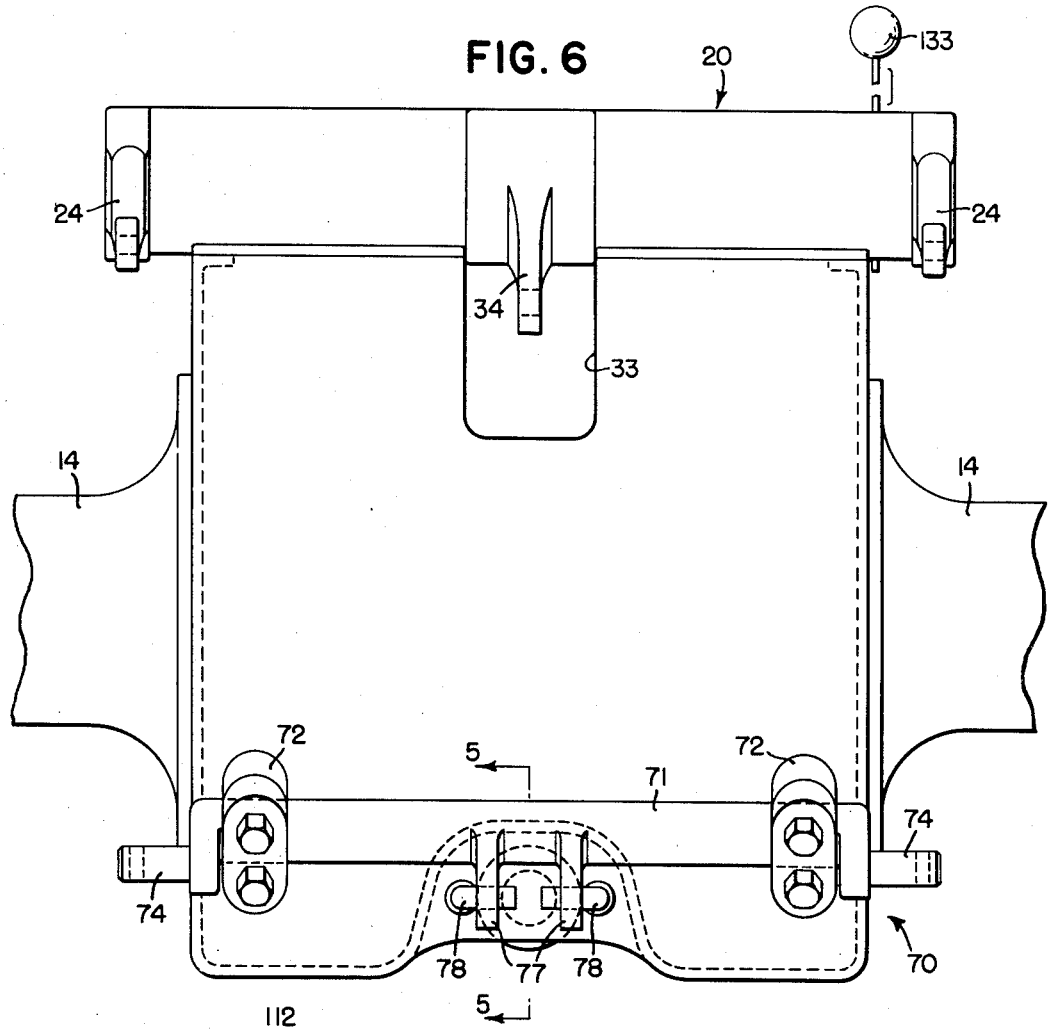
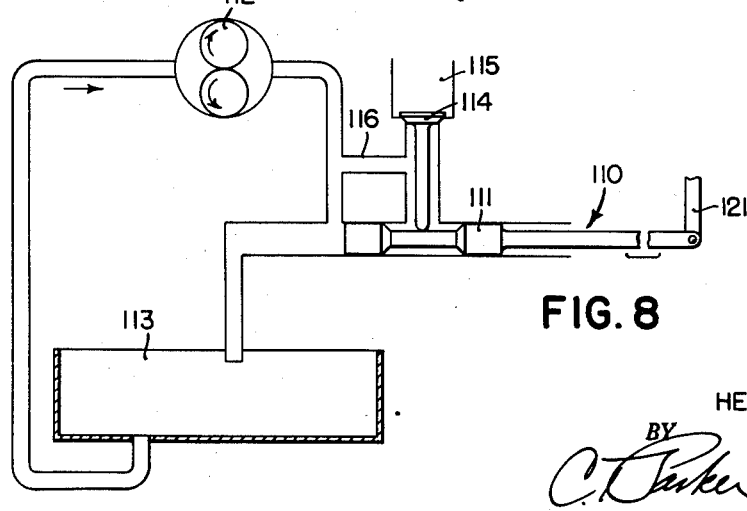
INVENTOR.
HERMAN E. ALTGELT
BY
ATTORNEYS July 17, 1956 H. E. ALTGELT 2,754,742
DRAFT AND POSITION CONTROL HITCH DEVICE
Filed Nov. 9, 1951 5 Sheets-Sheet 5
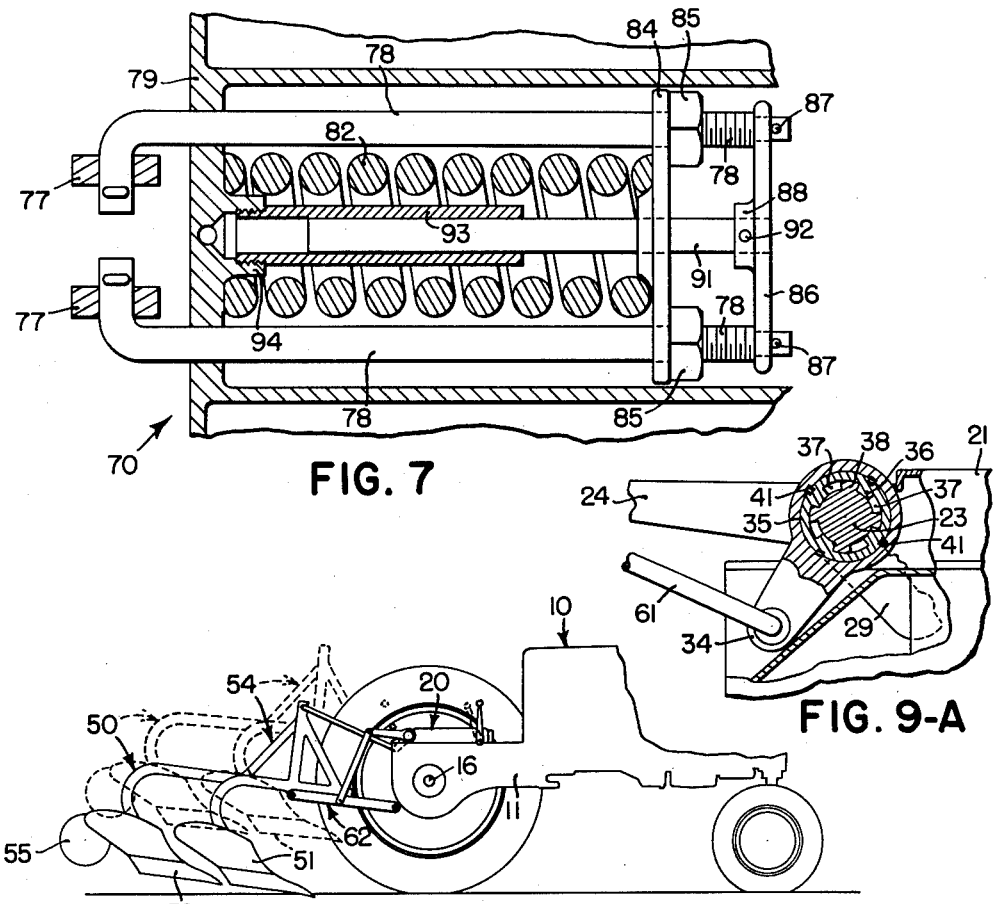
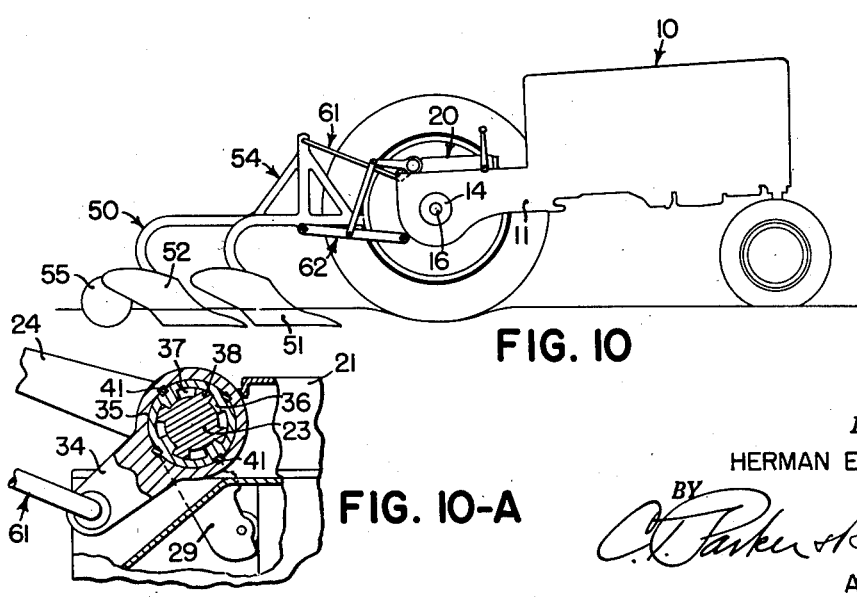
INVENTOR.
HERMAN E. ALTGELT
BY
ATTORNEYS United States Patent Office 2,754,742
Patented July 17, 1956

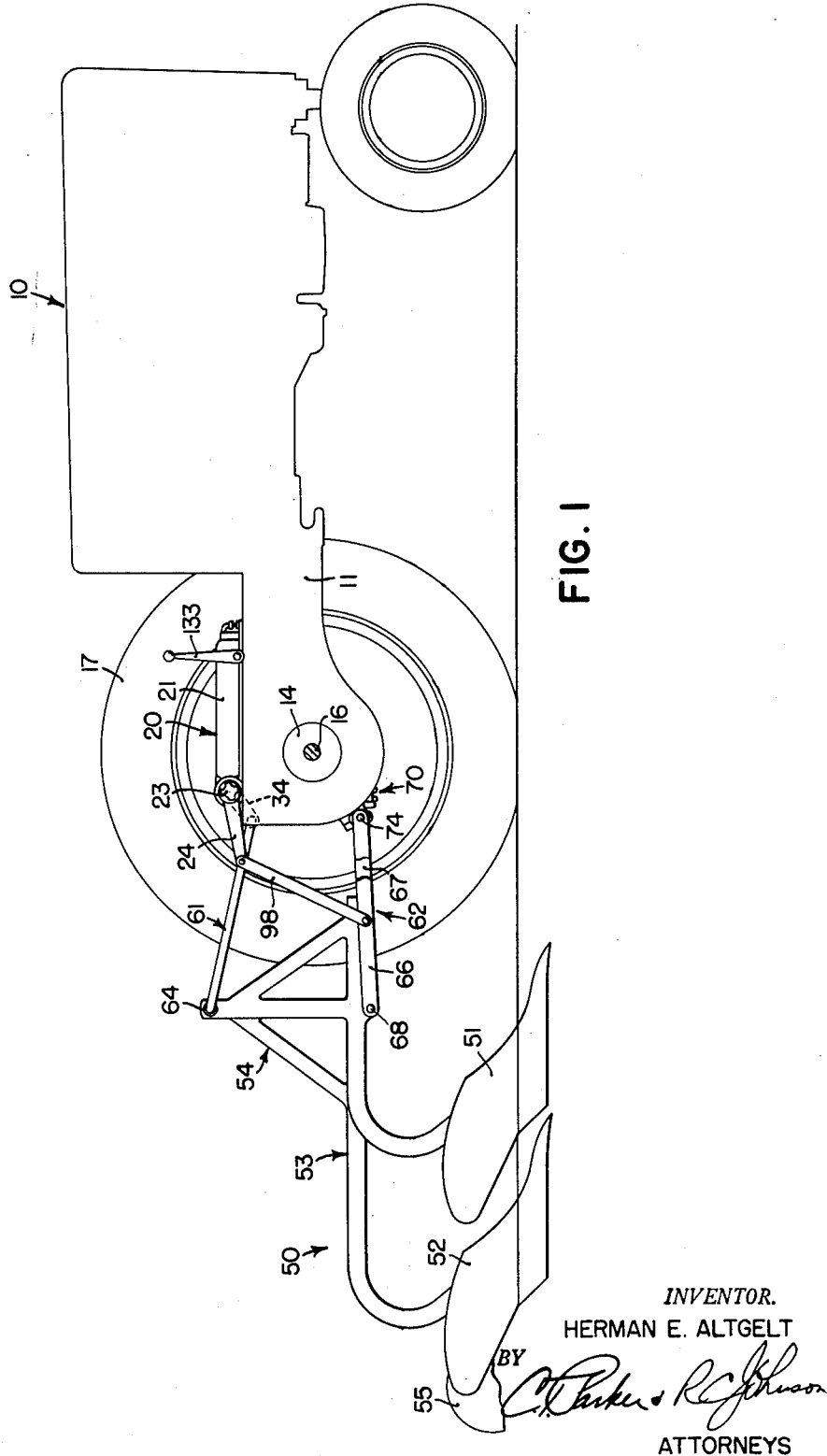

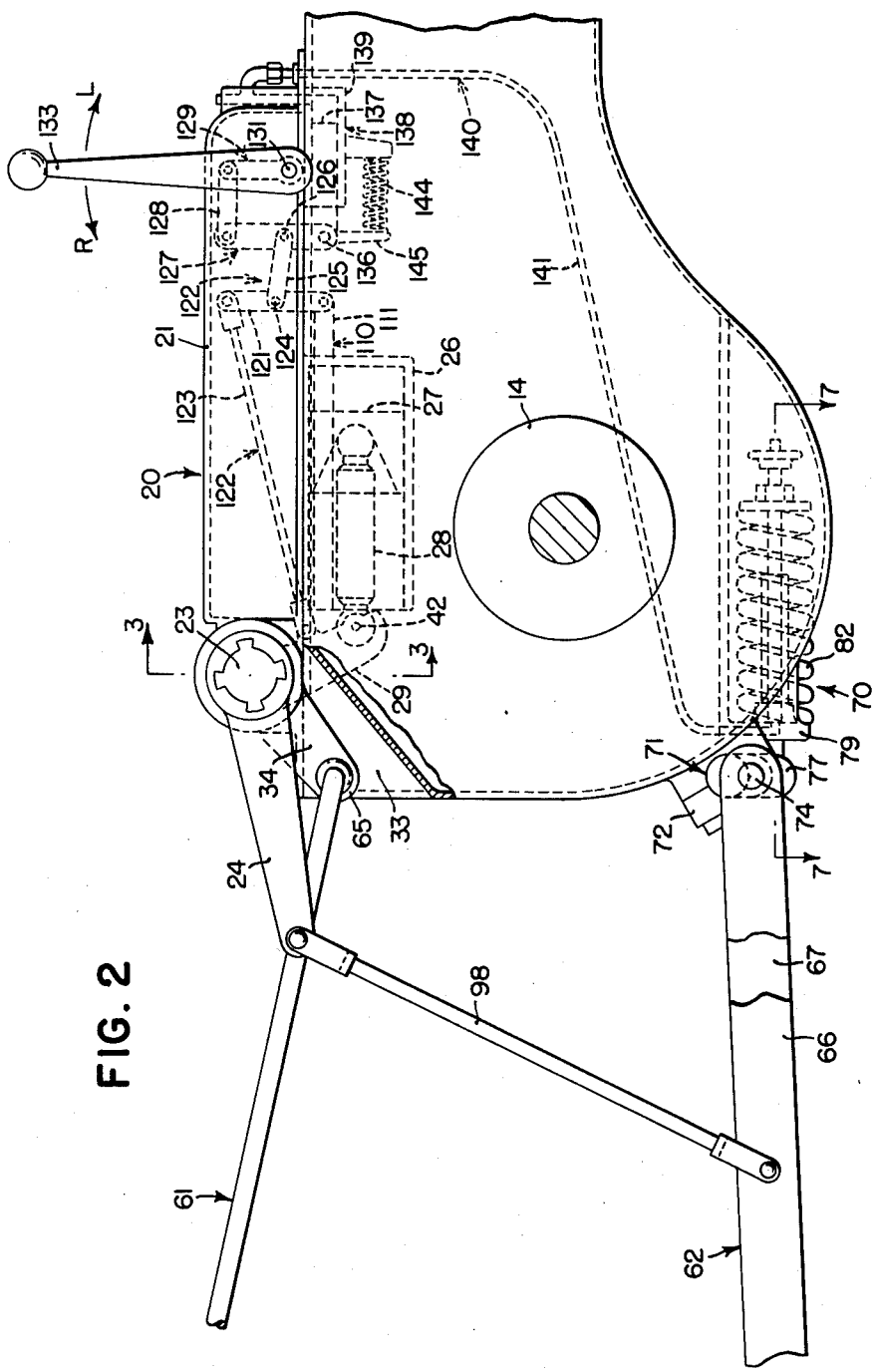

2,754,742

DRAFT AND POSITION CONTROL HITCH DEVICE

Herman E. Altgelt, Moline, Ill., assignor to Deere & Company, Moline, Ill., a corporation of Illinois Application November 9, 1951, Serial No. 255,657

17 Claims. (Cl. 97—47.52)

The present invention relates generally to agricultural implements and more particularly to power controlled hitch devices especially adapted to connect ground-working implements and the like to a propelling tractor having power-operated controlling and lifting means associated therewith.

The object and general nature of the present invention is the provision of an implement hitch and control means therefor so constructed and arranged that in normal working positions the implement may be raised and lowered into successively parallel positions while at the same time keeping the weight of the implement, together with the vertical component of any soil pressure exerted against the implement, imposed on the tractor so as to increase the effective traction thereof. More specifically, it is a feature of this invention to provide an implement hitch mechanism and associated controls so constructed and arranged that, in the case of such ground-working implements as plows and the like, the position of the implement may be adjusted by shifting the same to various generally parallel positions, as when raising and lowering the implement while in operation with the outfit moving forwardly, and also when raising the implement into a transport position, yet, by virtue of lost-motion means, provision is made whereby, when lowering the implement into ground-working position, the implement is tipped forwardly at an appreciable angle as soon as the ground-engaging means comes into contact with the ground, whereby the entry of the ground-working means of the implement into the ground is materially facilitated.

Additionally, it is a feature of this invention to provide an implement connection and associated mechanisms so constructed and arranged that the position of the implement is instantly changed in response to changes in the amount of draft imposed by the implement on the tractor, the implement being further under the control of a manually operated part, with an interconnected follow-up mechanism. By virtue of this construction, the manually operated part may be, for example, shifted into a maximum lowered position for the purpose of tilting the implement forwardly when lowering the same from a transport position to facilitate entry of the ground-engaging means into the ground and movement thereof to the desired depth.

These and other objects and advantages of the present invention will be apparent to those skilled in the art after a consideration of the following detailed description, taken in conjunction with the accompanying drawings, in which:

Figure 1 is a side view of an implement and tractor combination in which the principles of the present invention have been incorporated, the plow representing any ground-working tool and the same being shown in its normal operating position when moving over substantially level terrain.

Figure 2 is an enlarged fragmentary view also constituting, in part, a side view of portions of the implement and tractor as shown in Figure 1, certain of the hydraulic units being indicated somewhat diagrammatically.

Figure 3 is an enlarged fragmentary sectional view taken generally along the line 3—3 of Figure 2.

Figure 4 is an enlarged detail view of the lifting arm and associated power-operated bell crank, Figure 4 being a sectional view taken generally along the line 4—4 of Figure 3 with certain portions shown in elevation.

Figure 5 is a sectional view taken generally along the line 5—5 of Figure 6.

Figure 6 is a rear view showing the lower rockshaft of the draft-responsive unit and associated structure, the transverse bail of the draft-responsive unit and associated parts.

Figure 7 is a sectional view taken along the line 7—7 of Figure 5.

Figure 8 is a diagrammatic view of a portion of the power lift mechanism.

Figures 9 and 9a show the positions of the parts when the plow first enters the ground.

Figures 10 and 10a show the positions of the parts when the rear wheels of the tractor drop into a depression.

Referring now to the drawings, particularly Figure 1, the tractor, which represents any suitable implement propelling agency, is indicated in its entirety by the reference numeral 10 and comprises a generally longitudinally extending body section 11 on the front portion of which is a tractor engine and which is supported by front dirigible wheels. The rear end of the tractor body 11 is provided with rear axle housing sections 14 carrying drive axles 16 on which traction wheels 17 are fixed.

The tractor 10 includes a power operated device or power lift unit in the form of a hydraulic power lift mechanism indicated in its entirety by the reference numeral 20 and which includes a control housing 21 carrying at its rear portion a transversely extending power lift rockshaft 23 on the ends of which power-actuated lift arms 24 are fixed. The power lift unit 20 also includes a power cylinder 26 in which a piston 27 is movable, the piston being connected through a connecting rod 28 with an arm 29 that is connected for limited movement relative to the rockshaft 23. To this end, the rockshaft is splined from end to end, as best shown in Figure 3, and each lift arm 24 is provided with a hub portion 31, shaped to receive the splined rockshaft 23, which is mounted for rocking movement in the ends of the rear portion of the power lift housing 21. The central portion of the housing 21 is open, as at 33, and an arm 34 extends outwardly through the space 33. The arm 29 is provided with a hub portion 35 which is splined, as at 36 (Figure 4), but the splines 36 are arranged so that there is a space 37 between the splines 36 and splines 38 on the rockshaft 23. The arm 34 has a hub portion 39 which is fixed, as by one or more keys 41, to the hub of the arm 29. Thus, the two arms 29 and 34 are rigidly interconnected and, taken together, constitute bell crank means which is movable through a limited distance relative to the rockshaft 23 on which the bell crank 29, 34 is supported. In other words, the movable arm means 34 constitutes a first movable means that is operatively connected with the arm 29 of the power lift device 20 through the hub 39 and key 41. The arm 29 is pivotally connected, as at 42, with the rear end of the connecting rod 28 of the hydraulic power unit 20, and when the latter is actuated the lost motion, indicated at 37 above, is first taken up (which is the relationship of the parts illustrated in Figure 4) and then further movement of the bell crank 29, 34 acts to rock the rockshaft 23 and raise the lift arms 24 connected to the ends of the shaft 23 outside the housing 21. The parts 23 and 35, between which there is permissive movement as indicated at 37, thus constitute lost-motion means connected with the arm 34 and through the latter with the associated link 61. The control of the operating fluid flowing directly to and from the cylinder 26 will be referred to later.

The implement that is connected with the tractor 10 by hitch means in which is incorporated the principles of the present invention is indicated in its entirety by the reference numeral 50 and comprises a two-bottom plow having a front plow bottom 51 and a rear plow bottom 52 carried on a plow frame 53 which includes a vertically extending bracket structure 54. A rear furrow wheel 55 is connected in any suitable way with the rear beam of the plow frame 53. The plow may be substantially the same as the plows shown in the Ferguson Patents 1,687,719, dated October 16, 1928, and 2,195,515, dated April 2, 1940, if desired. However, to illustrate the principles of the present invention, the plow 50 has been shown as a two-bottom plow, rather than a single bottom plow, as in the above-mentioned Ferguson patents. Generally speaking, the plow 50 represents any implement having ground-engaging, ground-working or other positionable means, such as the plow bottoms 51 and 52, whose operating position may be changed, as to increase or decrease the depth of plowing, or the like.

The plow 50, which thus represents any suitable agricultural implement, is connected with the tractor 10 by hitch means that includes upper and lower link means indicated at 61 and 62, respectively. The lower link means 62 form a draft-transmitting connection between the implement and the tractor. The upper link means 61 is connected by a ball and socket connector 64 with the upper end of the bracket structure 54 of the plow 50 and the forward end of the link means 61 is pivotally connected, as at 65, with the bell crank arm 34 described above, the bell crank arm 34 normally extending downwardly and rearwardly relative to the tractor while the link 61 extends upwardly and rearwardly from the outer end of the arm 34. By virtue of this angular arrangement, when the arm 34 is rocked about the axis defined by the rockshaft 23, a generally forwardly or rearwardly directed thrust is applied to the upper end of the bracket 54. In this way, rocking the arm 34 results in the transmission of a tilting action to the implement 50 to rock the same in a generally fore-and-aft direction in a generally vertical, longitudinally extending plane. Thus, the arm 34 constitutes a first movable means in the form of a member that is adapted, when moved, to shift the upper link 61 in a generally fore-and-aft direction and so tilt the implement 50. A second movable means, such as the rockshaft 23 and lift arms 24, with associated parts, is provided for shifting the plow 50 generally vertically. The lower link means 62 preferably comprises a pair of laterally spaced apart links 66 and 67 and is connected at laterally spaced apart points 68 with the lower portion of the bracket structure 54 by suitable ball and socket connectors. The forward ends of the links 66 and 67 are connected to a draft-responsive unit or device, which is indicated in its entirety by the reference numeral 70 and which forms the principal part of a draft-responsive connection between the plow 50 and the tractor 10, whereby the latter propels the implement in operation. As best shown in Figures 2 and 6, the draft-responsive unit 70 comprises a part in the form of a transverse rockshaft or bail member 71 mounted for rocking movement about a transverse axis in a pair of laterally spaced apart bearing brackets 72 carried by the tractor. The end portions of the rockshaft 71 are formed as cranks 74 to which the forward ends of the links 66 and 67 are connected through ball and socket connectors. Depending from the central portion of the rockshaft or bail member 71, best shown in Figure 6, is a pair of apertured arms 77, the apertures therein receiving the laterally inturned ends of a pair of rod members 78 that are mounted for fore-and-aft sliding movement in a depending bracket structure 79 fixed to or carried by the lower rear portion of the tractor. Mounted between the rods 78 is a compression spring 82, the spring 82 bearing at its rear end against the forward face of the bracket 79 and at its forward end against a crossbar 84 which is slidable on the rods 78 but held in one position thereon by adjustable nuts 85. The forwardmost ends of the rods 78 are reduced in cross section and have a shouldered fit in suitable apertures formed in a crosshead 86 that is held in place on the ends of the rods 78 by cotter pins 87 or the like. The central portion of the crossbar 86 carries a boss or pad 88 to which the forward end of a plunger 91 is fixed, as by a pin 92. The plunger 91 extends through an opening in the crossbar 84 and into a cylinder 93 that is fixed at its rear end, as by a threaded connection, to a bored boss 94 formed on or carried by the depending bracket 79. The plunger 91 has a substantially fluid-tight sliding fit within the cylinder 93. When there is no load imposed on the lower links 66 and 67, the spring 82 serves to hold the depending arms 77 up against the rear face of the depending bracket 79, and to this end the arms 77 have portions slabbed off, as at 95, so as to provide a firm substantial abutment at these points. The amount of compression in the spring 82 may be adjusted by turning the adjusting nuts 85 in one direction or the other. Thus, the compression in the spring 82 may be varied, as desired, without changing the relation between the plunger or piston 91 and the rods 78. Each of the lower links 66 and 67 is connected with the associated lift arm 24 through a rigid link member 98. Thus, the plunger 91 constitutes a part that is movable in response to changes in the magnitude of the draft, and the rockshaft 23, arms 24, and the lift links 98, together with the lower links 66 and 67, constitute a raising means adapted, as explained below, to raise the implement 50.

The valve mechanism which controls the flow of fluid to and from the cylinder 26, and thereby serves as control means for the power operated lift device 20, is indicated in its entirety by the reference numeral 110 and is shown diagrammatically in Figure 8. The present invention is not especially concerned with the particular details of the valve mechanism, the same being substantially like that shown in the patent to Worstell 2,477,710, dated August 2, 1949. Reference may be had, if desired, to the Worstell patent, and therefore it will suffice for the purposes of the present disclosure to point out that the valve mechanism 110 includes a valve body 111 movable to the left (Figure 8) from a neutral position into one position cutting off the low pressure discharge flow of fluid from a pump 112 back to a sump 113, whereby fluid under high pressure may be directed through a passage 116 and past a check valve 114 into a conduit 115 leading to the closed end of the cylinder 26. The other position of the valve 111 is to the right of that shown in Figure 8, and in this position the stem of the check valve 114 is forced upwardly, thereby opening the check valve 114 and permitting fluid to flow from the cylinder 26 past the check valve 114 and through the passage portion 116 of the valve unit to the sump 113.

The valve 111 is moved from one position to another by a valve controlling link 121, one end of which is pivotally connected with the valve 111 and the other end of which is connected to a follow-up mechanism 122, which includes a rod 123 pivotally connected to the upper end of the link 121 and to the bell crank arm 29. The rod 123 constitutes a motion-transmitting means that is connected through the arm 29 with the movable member 34, and the mechanism 122, being connected with the arms 29 and 34, constitutes a position-responsive means. The valve operated link 121 is pivoted, as at 124, to a link member 125, and the other end of the link member 125 is pivotally connected, as at 126, to a second link member 127. The upper end of the latter link member is connected by a link 128 to a short arm 129 that is fixed rigidly to a shaft 131 that extends to a point outside the power lift housing and has fixed to its outer end an adjustable manually movable part in the form of a hand lever 133. By suitable detent and sector means, friction means, or the like, the hand lever 133 may be moved into different positions and automatically held in that position until manually moved to some other position. The end of the link 127 opposite the link 128 is pivotally connected, as at 136, to the plunger 137 of a piston and cylinder device 138. The cylinder 139 of the latter is connected by passage means 140, certain portions of which are formed by the power lift housing walls and other portions of which are formed by a fluid-tight tube 141 and by interconnected bores 142 and 143 (Figure 5) in the bracket 79 or some other convenient part of the tractor, with the cylinder 93 of the draft-responsive device 70. Thus, the tube 141 and associated parts, such as the plunger 91, crossbar 84, crosshead 86, rod members 78, and arms 77, provide a connection for transmitting motion of the movable part 71 of the draft-responsive device to the lower end of the link 127, which is a part of the control means 110. A spring 144 is anchored at one end to the frame of the tractor and at the other end is connected to an extension 145 on the link 127. By virtue of the spring 144, the lower end of the link 127 is moved forwardly, relative to the tractor, when the plunger 91 is moved forwardly, as by a decrease in the draft transmitted.

The operation of the above described form of the present invention is substantially as follows.

Figure 1 represents the outfit operating at a normal or intermediate depth of operation. If there should occur an increase in the draft of the plow, due to increased soil resistance, the spring 82 will yield slightly, permitting the lower links 66 and 67 to move rearwardly. The cross members 84 and 86 also move rearwardly, and rearward movement of the member 86 causes the plunger 91 to move rearwardly, and this movement is transmitted through the confined column of fluid in the tube 141 and associated parts to the control plunger 137. Rearward movement of the plunger 137 then serves to rock the link 127 clockwise about its pivotal connection with the link 128, the hand lever 133 being held at this time in a stationary position relative to the tractor. The rearward swinging of the link 127 causes a rearward movement of the link 125, and since at the moment the follow-up link 123 is held against movement, the rearward swinging of the link 121 shifts the valve 111 rearwardly, thus closing off the discharge of fluid from the pump 112 to the sump, whereby fluid under pressure is pumped past the check valve 114 and into the conduit 115, which leads to the closed end of the cylinder 25. This increase in volume of fluid forces the piston 27 rearwardly, and the connecting rod 28, which has bearing contact at its forward end with the socket in the rear face of the piston 27, transmits this motion to the bell crank arm 29. The resulting movement of the arm 34 exerts a generally rearwardly directed thrust through the upper link 61 to the upper portion of the implement bracket structure 54, which tilts the plow 50 rearwardly and causes the plow bottoms to move upwardly in the ground to a position of reduced depth of plowing. However, when this occurs the lost motion 37 between the bell crank 29, 34 and the shaft 23 is taken up, so that if the overload on the draft responsive unit is still present, the continued movement of the bell crank arm 29 is then transmitted through the shaft 23 to the lifting arms 24, which raises the lower links 66 and 67 about their pivotal connections with the crank ends 74 of the swingable rockshaft or bail 71. The pivots and lengths of the associated links and other parts are such that as the upper link 61 moves rearwardly and upwardly, the lower links 66 and 67 are also moved upwardly in such relation with respect to the rearward component of the movement transmitted to the upper link 61 by the arm 34 that, during substantially all normal depths of operation, the plow is maintained in substantially a level position at all times. This has the advantage that fore-and-aft spaced portions of any implement are maintained substantially level in operation, such as, for example, two fore-and-aft spaced plow bottoms, as shown at 51 and 52 in Figure 1, or such as the front and rear gangs of a tandem disk harrow, or such as a planter having a forwardly disposed furrow opener and a rearwardly disposed press wheel or coverer means. Thus, so long as the tractor is operating in a substantially level position, the tool or tools will also be maintained in a substantially level position, irrespective of changes in the depth due to variations in the draft. It will be noted that when the bell crank arms 29 and 34 are rocked rearwardly and upwardly, to exert a rearward thrust through the link 61 against the implement, the lift arms 24 are also swung upwardly after the lost motion at 37 has been taken up and act through the rigid links 98 to raise the arms 66 and 67. This action has no appreciable effect upon the responsiveness of the draft-responsive unit 70, since the bail 71 can sustain the upwardly directed reaction imposed thereon at the front ends of the links 66 and 67 when the rear ends are raised to elevate the tool since the crank ends 74 occupy a position substantially directly underneath the pivot of the bail member 71 in the bearing brackets 72.

If it should be desired at any time to increase, or decrease, the depth of operation of the implement tool units or the like, while draft conditions remain substantially constant, all that the operator has to do is to shift the hand lever 133 in one direction or the other. Assume, for example, that the operator desires to lower the plows 51 and 52. The operator shifts the hand lever 133 forwardly, and this exerts a pull through the link 128 against the swingable member 127, which now swings about the lower pivot 136 on the draft control plunger 137. This results in a forward movement of the link 125, which is transmitted to the valve 111, the link 121 pivoting about its upper pivot connection with the follow-up rod 123. The forward movement of the valve member 111 acts to unseat the check valve 114, thus permitting the fluid to flow out of the main lift cylinder 26 and back to the sump of the hydraulic mechanism, whereby the weight of the tools, plus the downward reaction of the soil thereagainst, serves to lower the plows into a deeper operating position. However, such movement is automatically terminated according to the setting of the hand lever 133, since as the fluid flows from the cylinder 26, the bell crank 29, 34 swings in a counterclockwise direction (Figure 2), and this causes the follow-up link 123 to be moved forwardly, thus swinging the link 121 about the pivot 144 and moving the valve member 111 rearwardly until it permits the check valve 114 to close, thus restoring the valve 111 to its neutral or intermediate position. The above-mentioned follow-up mechanism 122 also acts in substantially the same way to restore the valve 111 to its neutral position after an operation of the tractor hydraulic unit by an increase or a decrease in the draft sufficient to actuate the draft-responsive unit 70.

Thus, by virtue of the above described form of the present invention, I have provided an implement having an operating unit which is subject to simultaneous control by two factors, one constituting a draft-responsive device and the other constituting a manually shiftable unit, either being adapted to dominate the other, according to whether an increase or a decrease in the draft effort occurs or according to whether the operator desires to increase or decrease the depth of operation with substantially the same draft effort being applied. If the front end of the tractor should momentarily drop into a depression, or the rear wheels ride over a ridge or the like, the plow is not pulled out of the ground, for just as soon as the plow is raised slightly the draft is decreased and the spring 82 expands and acts through the body of confined fluid in the tube 141 and associated parts and through the links 127, 125, and 121 to shift the valve 111 to permit the plow to lower, which movement is terminated by the follow-up linkage 122 acting in conjunction with the movement of the upper control plunger 137 and associated parts as the increasing draft again compresses the springs 82. The links 121, 125, 127, and 128, with associated pivots and other parts, constitute a differential linkage connecting the draft-responsive unit 70 and the hand-operated lever 133 with the valve controlling the power lift hydraulic unit, whereby the valve is placed under the simultaneous control of both means. At the same time, the associated follow-up means 122 acts at any time to restore the valve 111 to its neutral or intermediate position after a displacement therefrom, either by movement of the hand lever 133 or by operation of the draft-responsive unit 70.

The implement 50 is moved into its raised or transport position by swinging the hand lever 133 all the way rearwardly, which moves the valve 111 into a position directing fluid under pressure into the main cylinder 26 so as to swing the bell crank 29, 34, the rockshaft 23 and the lift arms 24 in their completely raised position, which lifts the plow 50 into its transport position as shown in dotted lines in Figure 9. After the outfit has been driven to the field and it is desired to begin plowing, all that the operator has to do is to swing the lever 133 forwardly into a position corresponding to the depth of operation desired. This movement of the hand lever 133 shifts the valve 111 to permit fluid to flow out of the cylinder 26 until the valve 111 is restored to its neutral position by the forward movement of the follow-up rod 23. As best shown in Figure 9, when the plow is being lowered into operating position, by the movements just described, as soon as the point of the forward plow engages the ground, the plow no longer moves directly downwardly but, instead, the continued counterclockwise movement of the bell crank 29, 34, due to the forward thrust exerted thereon by the upper link means 61, forces fluid from the cylinder and permits the plow to tip forwardly until the lost motion 37 is taken up (see Figure 9a), thereby, in effect, pointing the plows downwardly at an increased angle and thereby materially facilitating the rapid entry of the plow into the ground. As the outfit continues its forward travel, the plow levels out at the desired depth of operation by virtue of, first, the forward movement of the follow-up link 123 acting against the link 121 and valve 110 to permit the check valve 114 to close and, second, by the action of the draft-responsive unit 70, in which, as the draft comes on the unit 70, the spring 82 yields slightly which causes some rearward movement of the piston or plunger 137. As a result of these combined actions, the valve 111 is rapidly brought to its normal or holding position when the plows reach their depth of operation, at which depth they are substantially level. In order to have the plow enter the ground as quickly as possible the valve lever 133 is initially swung into its lowest position, but after the plow enters the ground the lever 133 is then raised to the desired depth of operation.

If the front wheels of the tractor should pass over a ridge, or the rear wheels drop into a depression, there is no tendency, according to the principles of the present invention, for the plow to be forced into the ground. First, it will be remembered that the lift arms 24 may move upwardly a limited amount, by virtue of the lost motion shown at 37 in Figures 4 and 10a, without restriction, and this permits the plow 50 to move upwardly relative to the rear of the tractor without any action by the hydraulic unit. If, however, the ridge, or the depression, is so severe that the draft is increased, then the rearward yielding of the spring 82, with the resulting rearward movement of the plunger 91, causes the control plunger 137 to move rearwardly, and this acts through the differential linkage to shift the valve 111 in a direction to cause the power unit of the tractor to pump fluid into the cylinder 26, thus momentarily raising the plow even further by first shifting the arm 34 rearwardly, which tips the plow backwardly, and then swinging the arm 24 upwardly which acts to raise the rear links 66 and 67. The action of the follow-up mechanism 122 as the plow is raised, together with the corresponding decrease in the draft, acts rapidly to stop the raising of the plow at the desired point, without any tendency to overrun.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. For use with a ground-working implement adapted to be connected with a tractor having a power operated device and control means therefor, the improvement which includes hitch means for connecting the implement to the tractor, which comprises upper and lower link means, means for connecting said upper and lower link means with the implement and the tractor, one of said link means being connected to move in a generally fore-and-aft direction relative to the tractor, said connecting means including a draft-responsive device having a part movable in response to changes in the draft, and a member adapted when moved to shift said one link means in a generally fore-and-aft direction to tilt the implement in a vertical longitudinal plane relative to the tractor, means for connecting said movable part with said power control means for operating said tractor power operated device in response to changes in the draft, and means for connecting said member with said device whereby said implement is tilted in said plane when said draft changes.

2. For use with a tractor having a power lift device and control means therefor, an agricultural implement connecting means including upper and lower link means adapted to be connected at their rear ends with said implement at upper and lower points thereon, means including a resiliently mounted part receiving the forward end of one of said link means and adapted to be movably connected with the tractor, the other link means being movable in a generally fore-and-aft direction relative to the tractor, movable means acting against said other link means for shifting the same in a generally fore-and-aft direction, means for connecting said movable means with the tractor power lift device, whereby operation of the latter acts through said movable means for shifting said other link means in a generally fore-and-aft direction, and a connection adapted to extend from said resiliently mounted part to the control means of the tractor power lift device, whereby said one link means is adapted to be moved by said power lift device in response to changes in the position of said resiliently mounted part.

3. The invention set forth in claim 2, further characterized by lost-motion means connected with said movable means and one of said link means, said lost-motion means providing for raising of the implement after said movable means has shifted the link means associated therewith through a given range in a generally fore-and-aft direction.

4. For use with a tractor having a power lift device and control means therefor, an agricultural implement connecting means including a pair of upper and lower links adapted to be connected at their rear ends with said implement at upper and lower points thereon, means including a resiliently mounted part receiving the forward end of the lower link and adapted to be movably connected with the tractor, movable means mounted for rocking movement on the tractor and including a portion having a component of movement in a generally fore-and-aft direction, pivot means connecting said portion with the upper link for shifting the same in a generally fore-and-aft direction, means for connecting said movable means with the tractor power lift device whereby operation of the latter acts through said movable means for shifting said upper link in a generally fore-and-aft direction, and a connection adapted to extend from said resiliently mounted part to the control means for the tractor power lift device.

5. For use with an agricultural implement having a positionable operating means, the combination of a first movable means operative through one range of movement and in a generally fore-and-aft direction to change the position of said operating means, a propelling agency, a power-operated unit operated thereby, a draft-responsive connection between said propelling agency and said agricultural implement, motion-transmitting means connected to move with said first movable means, a manually adjustable part, means for differentially connecting said motion-transmitting means and said draft-responsive means with said manually controlled part and said power-operated unit, whereby changes in either the draft or the position of said manually controlled part serves to act through said power unit for shifting said first movable means, raising means connected with said positionable operating means and adapted to raise the latter into a relatively high position, and a lost-motion connection between said first movable means and said raising means, whereby the manually controlled part and the draft-responsive means may be shifted to move said first movable means through a first range to shift said positionable operating means in a generally fore-and-aft direction and through a second range to raise said positionable operating means.

6. For use with an agricultural implement having ground-working means that may be tilted in a generally fore-and-aft direction, or raised and lowered, the combination of a first movable means operatively connectible with said implement for shifting the same in either a fore or aft direction, a second movable means having a lost-motion connection with said first movable means and operative by movement of the latter in one of its directions to raise said implement toward a transport position, movement of said first movable means in the other of its directions acting to tilt the implement in a fore-and-aft direction independently of the position of said second movable means, means including a draft-responsive connection for propelling said implement, a power-operated unit for shifting said first movable means, means for controlling said power-operated unit, a manually shiftable part, a differential linkage operatively connecting said manually shiftable part and said draft-responsive means with said power unit for operating the latter either by said draft-responsive means or said manually shiftable part, and a follow-up connection between said first movable means and said differential linkage.

7. In an agricultural implement including ground-working tool means adapted to be connected with a tractor having a power operated lifting means, a control means therefor, draft- and position-responsive means connected to operate said control means, and an implement-controlling unit including a movable part operated by said power operated means, the improvement comprising a draft-transmitting connection, means for attaching said connection to said tool means and said draft-responsive means, means for connecting said movable part with said tool means for raising the latter in response to movement of said part in one direction, and lost-motion means incorporated in said connecting means, whereby said tool means may move upwardly freely relative to said movable part.

8. For use with an agricultural implement and tractor combination, in which said tractor includes a power operated unit and said implement includes positionable operating means adapted to be tilted in a fore-and-aft direction and also adapted to be raised and lowered, the improvement comprising a lower draft-transmitting link means operatively connected at its rear end with the implement, a resilient draft-responsive unit adapted to be carried by the tractor and receiving the forward end of said link means, a bell crank adapted to be mounted on the tractor and having one arm adapted to be operatively connected with said power unit, upper link means connected at its rear end with said implement above said lower link means, a lifting arm having a lost-motion connection with said bell crank and operatively connected with said lower link means, and means for pivotally connecting the forward end of said upper link means with the other arm of said bell crank, the lengths of said link means, said lifting arm and said bell crank arms being such that when the bell crank is operated in one direction said implement will be raised into substantially parallel positions, a manually movable part, differential link means connecting said manually movable part and said draft-responsive means with said power unit, and follow-up means acting between said bell crank and said differential linkage, said manually operated part acting through said differential linkage and said power unit for swinging said bell crank in a lowering direction for tilting said implement generally forwardly, independently of the position of said lifting arm.

9. For use with an agricultural implement adapted to be connected with a tractor having a power-operated device and control means therefor, the improvement which includes upper and lower link means adapted to be connected at their rear ends with said implement at upper and lower points thereon, means for connecting the lower link means in draft-transmitting relation with the tractor, a bell crank adapted to be mounted on the tractor and connected to be shifted by operation of said power-operated device, means for pivotally connecting the forward end of the upper link means with said bell crank, whereby operation of the latter serves to shift the upper portion of the implement in a generally fore-and-aft direction, a member adapted to be movably mounted on the tractor and connected with said lower link means whereby movement of said member in one direction serves to raise said lower link means and the implement associated therewith, a lost-motion connection between said bell crank and said lifting member, said lost-motion means serving to transmit motion from said bell crank to said lifting member in the upward direction but providing for movement of the bell crank relative to said lifting member in the lowering direction of said bell crank, the upper portion of said implement being tilted forwardly when said bell crank is moved in the lowering direction, a manually operated part, a follow-up member operatively connected with said bell crank, and differential linkage connected between said manually operated part and said follow-up member and said control means, said manually controlled part being adapted to be moved into a direction to cause said bell crank to move away from said lifting member, by virtue of said lost-motion means, and tilt said implement forwardly.

10. The invention set forth in claim 9, further characterized by draft-responsive means adapted to be connected between the forward end of said lower link means and the tractor, and means differentially connecting said draft-responsive means with said follow-up member, control means, and manually operated part, whereby said control means may be operated by either said manually operated part or said draft-responsive means.

11. A hitch device for connecting a ground-working agricultural implement having generally fore-and-aft spaced apart, ground-engaging means with a tractor having power operated raising and lowering means, said hitch device comprising generally fore-and-aft extending lower link means adapted to be connected at its end portions for generally vertically swingable movement with said implement and the tractor at relatively low points thereon, an upper generally fore-and-aft swingable upper link means adapted to extend generally in a fore-and-aft direction and to be connected at its rear end portion for generally vertical swinging with said implement at a point above said lower link means, a lifting arm adapted to be mounted on the tractor for generally vertical swinging about a transverse axis, a rigid member pivotally connecting said arm with the lower link means whereby the latter and said arm swing together both upwardly and downwardly, a second arm adapted to be mounted on the tractor and having a lost-motion connection with said lifting arm arranged whereby upward movement of said second arm takes up said lost motion and causes said arms to be swung upwardly together, said lifting arm acting through said lower link means to raise said implement, means connecting the forward end portion of said upper link means to said arm at such point thereon, relative to the axis of swinging of said second arm, that when said arms move upwardly together said second arm acts through said upper link means against said implement to hold it substantially level in a fore-and-aft direction as the implement is raised into a transport position out of contact with the ground by the upward movement of said lower link means, said lost-motion means providing for lowering movement of said second arm away from said second arm when lowering said implement, said lowering movement of said second arm serving to tilt said implement forwardly to facilitate entry of said ground-engaging means into the ground.

12. For use with an agricultural implement and tractor combination, in which said tractor includes a power operated unit and said implement includes positionable operating means adapted to be tilted in a fore-and-aft direction and also adapted to be raised and lowered, the improvement comprising a lower draft-transmitting link means operatively connected at its rear end with the implement, a resilient draft-responsive unit adapted to be carried by the tractor and receiving the forward end of said link means, a bell crank adapted to be mounted on the tractor and having one arm adapted to be operatively connected with said power unit, upper link means connected at its rear end with said implement above said lower link means, a lifting arm having a lost-motion connection with said bell crank and operatively connected with said lower link means, means for pivotally connecting the forward end of said upper link means with the other arm of said bell crank, differential link means connecting said draft-responsive means with said power unit, and follow-up means connecting said bell crank and said differential linkage.

13. For use with an agricultural implement and tractor combination, in which said tractor includes a controllable power operated unit and said implement includes positionable operating means adapted to be tilted in a fore-and-aft direction and also adapted to be raised and lowered, the improvement comprising a lower draft-transmitting link means adapted to be operatively connected at its rear end with the implement, a resilient draft-responsive unit adapted to be carried by the tractor and receiving the forward end of said link means, a bell crank adapted to be mounted on the tractor and having one arm adapted to be operatively connected with said power unit, upper link means adapted to be connected at its rear end with said implement above said lower link means, a lifting arm having a lost-motion connection with said bell crank and operatively connected with said lower link means, means pivotally connecting the forward end of said upper link means with the other arm of said bell crank, and a connection between said draft-responsive means and said controllable power unit.

14. For use with an agricultural implement and tractor combination, in which said tractor includes a controllable power operated unit and said implement includes positionable operating means adapted to be tilted in a fore-and-aft direction and also adapted to be raised and lowered, the improvement comprising a lower draft-transmitting link means operatively connected at its rear end with the implement, a resilient draft-responsive unit adapted to be carried by the tractor and receiving the forward end of said link means, a part adapted to be movably mounted on the tractor and having an implement-tilting section and an implement-raising section movable together, upper link means connected at its rear end with said implement above said lower link means, implement raising means having a lost-motion connection with said implement-raising section and operatively connected with said lower link means, means for pivotally connecting the forward end of said upper link means with said implement-tilting section, and a connection between said draft-responsive means and said controllable power unit.

15. For use with an agricultural implement and tractor combination, in which said tractor includes a controllable power operated unit and said implement includes positionable operating means adapted to be tilted in a fore-and-aft direction and also adapted to be raised and lowered, the improvement comprising a lower draft-transmitting link means operatively connected at its rear end with the implement, a resilient draft-responsive unit adapted to be carried by the tractor and receiving the forward end of said link means, means adapted to be movably mounted on the tractor and having an implement-tilting section and an implement-raising section movable together, upper link means connected at its rear end with said implement above said lower link means, implement raising means having a lost-motion connection with said implement-raising section and operatively connected with said lower link means, means for pivotally connecting the forward end of said upper link means with said implement tilting section, and a connection between said draft-responsive means and said controllable power unit.

16. For use with a ground-working implement adapted to be connected with a tractor having a power operated device and control means therefor, the improvement which includes hitch means for connecting the implement to the tractor, which comprises upper and lower link means, one of said link means being connected to move in a generally fore-and-aft direction relative to the tractor, means for connecting the upper link means with the implement and tractor, and means for connecting the lower link means with the implement and tractor, one of said link-connecting means including a draft-responsive device having a part movable in response to changes in the draft, the other of said link-connecting means including a member adapted when moved to shift said one link means in a generally fore-and-aft direction to tilt the implement in a vertical longitudinal plane relative to the tractor, means for connecting said movable part with said power control means for operating said tractor power operated device in response to changes in the draft, and means for connecting said member with said device whereby said implement is tilted in said plane when said draft changes.

17. For use with a ground-working implement adapted to be connected with a tractor having a power operated device and control means therefor, the improvement which includes hitch means for connecting the implement to the tractor, which comprises upper and lower link means, the upper link means being connected to move in a generally fore-and-aft direction relative to the tractor, means for connecting the upper link means with the implement and tractor, and means for connecting the lower link means with the implement and tractor, the connecting means for the lower link means including a draft-responsive device having a part movable in response to changes in the draft and the connecting means for the upper link means including a member adapted when moved to shift said upper link means in a generally fore-and-aft direction, means for connecting said movable part with said power control means for operating said tractor power operated device in response to changes in the draft, and means for connecting said member with said device whereby said implement is tilted in said plane when said draft changes.

References Cited in the file of this patent

UNITED STATES PATENTS

| | | |
|---|---|---|
| 2,118,180 | Ferguson | May 24, 1938 |
| 2,118,181 | Ferguson | May 24, 1938 |
| 2,223,002 | Ferguson | Nov. 26, 1940 |
| 2,273,875 | Livesey et al. | Feb. 24, 1942 |
| 2,347,898 | Ferguson | May 2, 1944 |
| 2,356,231 | Ferguson | Aug. 22, 1944 |
| 2,405,980 | Sands et al. | Aug. 20, 1946 |
| 2,437,875 | Chambers et al. | Mar. 16, 1948 |
| 2,455,727 | Bunting | Dec. 7, 1948 |
| 2,460,847 | Schwarz | Feb. 8, 1949 |
| 2,611,306 | Strehlow et al. | Sept. 23, 1952 |
| 2,611,307 | Strehlow et al. | Sept. 23, 1952 |
| 2,631,515 | McRae | Mar. 17, 1953 |

FOREIGN PATENTS

| | | |
|---|---|---|
| 253,566 | Great Britain | June 14, 1926 |